June 15, 1954   J. W. TONE   2,680,972
BEVEL GEAR DIFFERENTIAL ASSEMBLY
Filed Jan. 8, 1953
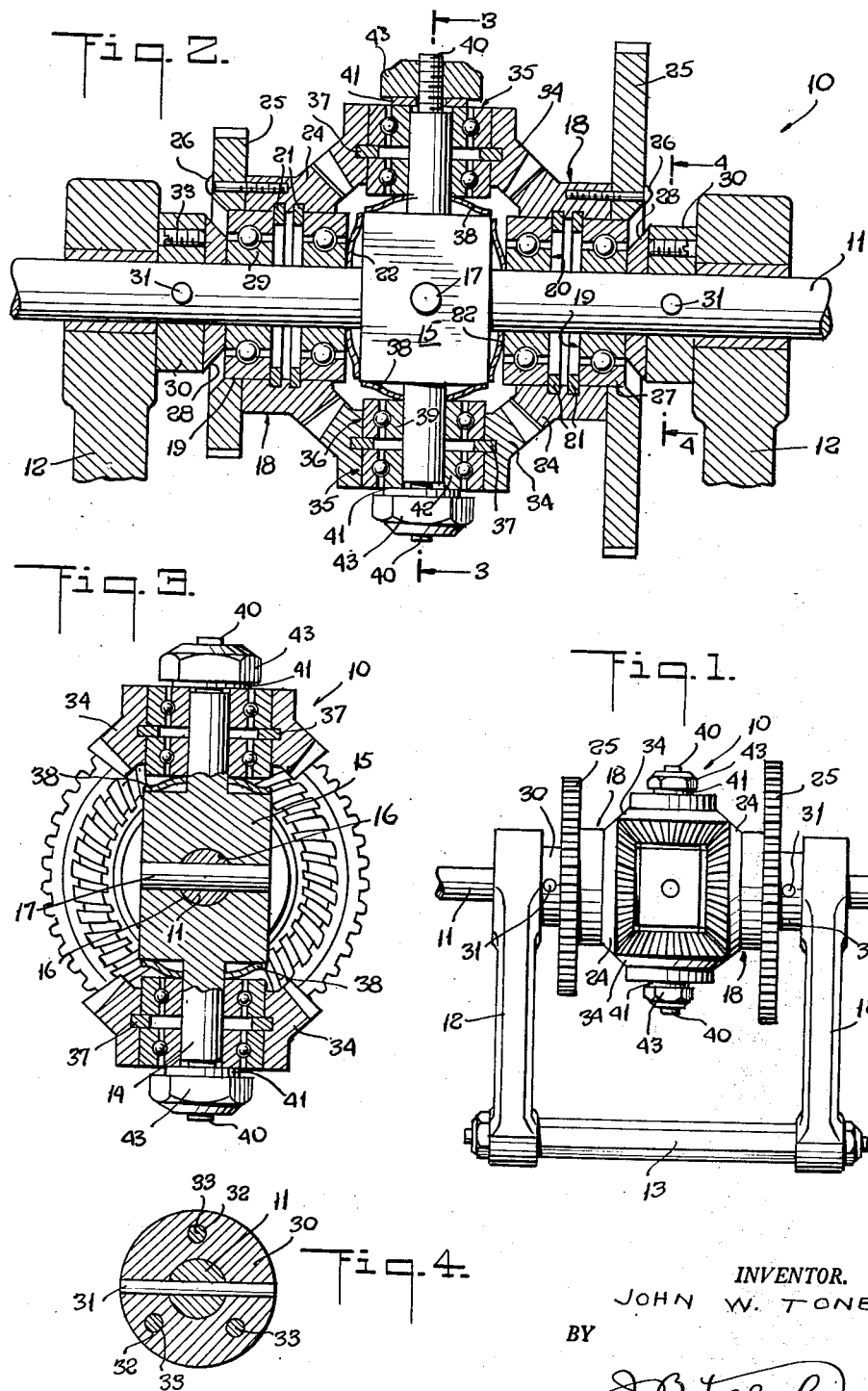
INVENTOR.
JOHN W. TONE
BY
*J. B. Telshin*
ATTORNEY Patented June 15, 1954

2,680,972

UNITED STATES PATENT OFFICE 2,680,972

BEVEL GEAR DIFFERENTIAL ASSEMBLY

John W. Tone, Roslyn Heights, N. Y., assignor to Belock Instrument Corporation, Brooklyn, N. Y., a corporation of New York Application January 8, 1953, Serial No. 330,210

10 Claims. (Cl. 74—675)

This invention relates to bevel gear differential assemblies.

It is an object of the present invention to provide a bevel gear differential assembly which includes means for the fine adjustment of all four bevel gears thereby achieving the best possible mesh between said gears, i. e. the least possible back-lash and breakaway and running torque.

It is another object of the present invention to provide a bevel gear differential assembly which includes means for the fine adjustment of all four bevel gears thereby providing position control during lapping and improving the involute surface finish as cut by the gear generator.

It is still another object of the present invention to provide a bevel gear differential assembly of the above type wherein the aforesaid adjustment is achieved for the two planetary bevel gears by the provision of threaded ends on the supporting shaft thereof in combination with self-locking or elastic stop nuts and spacer washers, the latter bearing on the inner races of the outer supporting ball bearing assemblies of said planetary gears.

It is still another object of the present invention to provide a bevel gear assembly of the above type wherein the aforesaid adjustment is achieved for the input bevel gears by the provision of collars pinned to the output shaft and carrying axially spaced set-screws bearing on a thrust washer which in turn moves these gears into mesh by bearing on the inner races of the outer supporting ball bearing assemblies of said input bevel gears.

It is still another object of the present invention to provide a bevel gear assembly of the above type which includes Belleville springs or spring washers acting on the inner races of the inner supporting ball bearing assemblies of each of the four bevel gears whereby to preload these bearings and to thereby more rigidly support these bevel gears thus minimizing backlash.

It is still another object of the present invention to provide a bevel gear differential assembly of the above type wherein the input spur gears are piloted directly on the outer races of the outer supporting ball bearings for the input bevel gears rather than the conventional pilot on the attached input bevel gears thereby eliminating one tolerance for runout accuracy, drive pins being utilized to secure the input spur gears to their associated input bevel gears.

It is still another object of the present invention to provide a bevel gear differential assembly of the above type wherein all the bevel gear meshes are adjustable for wear.

With the foregoing and other objects in view, the invention resides in the combination of parts and in the details of construction hereinafter set forth in the following specification and appended claims, certain embodiments thereof being illustrated in the accompanying drawing, in which:

Fig. 1 is a front elevational view of a bevel gear differential assembly embodying the features of the present invention;

Fig. 2 is a longitudinal sectional view thereof;

Fig. 3 is a vertical sectional view taken along line 3—3 of Fig. 2 and

Fig. 4 is a vertical sectional view taken along line 4—4 of Fig. 2.

Referring more in detail to the drawing, in which similar reference characters identify corresponding parts throughout the several views, there is shown a bevel gear differential assembly, referred to collectively as 10, and including an output axle or shaft 11 rotatably mounted in hanger bearing brackets 12, the lower ends of which are suitably connected to a spacer member 13, substantially as illustrated in Fig. 1.

A strut 14 is provided having an enlarged rectangular mid section 15, the section 15 being provided with a transverse opening 16 therethrough receiving the output shaft 11, as shown in Fig. 3. A pin 17 is located in aligned openings provided in shaft 11 and section 15, fixedly securing the latter to the former.

Spur and bevel gear assemblies, referred to collectively as 18, are rotatably mounted on output shaft 11 on each side of enlarged section 15 by means of double ball bearing assemblies 19 and 20, as shown in Fig. 2, retaining rings 21 being provided intermediate the bearing assemblies 19 and 20, substantially as illustrated.

Belleville springs or spring washers 22 are mounted upon output shaft 11 intermediate bearing assemblies 20 and section 15, the springs bearing on the inner races 23 of the assemblies 20 for a purpose to be hereinafter described.

Each spur and bevel gear assembly 18 consists of an input bevel gear 24 and an input spur gear 25, the latter being secured to the former by means of three radially spaced drive pins 26, substantially as illustrated in Fig. 2. As shown in Fig. 2, the internal diameter of spur gears 24 is the same as that of bevel input gears 23, permitting the former to be piloted directly on the outer races 27 of ball bearing assemblies 19 rather than the conventional pilot directly onto the attached bevel gear, thereby eliminating one tolerance for runout accuracy.

Thrust washers 28 are positioned on output shaft 11 adjacent spur gears 25 and are adapted to bear on the inner races 29 of bearing assemblies 19, substantially as illustrated in Fig. 2.

Collars 30 are positioned on the output shaft 11 adjacent thrust washers 28, the collars 30 and output shaft 11 being provided with aligned openings which receive pins 31 fixedly mounting the collars on the output shaft, as shown in Fig. 4. The collars 30 are provided with three internally threaded, radially spaced openings 32 receiving three set-screws 33, the latter being provided with the usual slots at their outer ends permitting their adjustment longitudinally against the thrust washers 28 by the insertion therein of a small bit screw-driver.

Planetary bevel gears 34 are rotatably mounted on strut 14 on each side of enlarged section 15 by means of double ball bearing assemblies 35 and 36, as shown in Figs. 2 and 3, a retaining ring 37 being provided intermediate the bearing assemblies 35 and 36, substantially as illustrated.

Belleville springs or spring washers 38 are mounted upon strut 14 intermediate enlarged section 15 and bearing assemblies 36, the springs 38 bearing on the inner races 39 of assemblies 36 for a purpose to be hereinafter referred to.

The strut 14 is integrally formed at each end with threaded extensions 40 which receive spacer washers 41 adapted to bear on the inner races 42 of bearing assemblies 35, substantially as illustrated in Figs. 2 and 3.

The bevel gear differential assembly 10 is completed by elastic stop nuts or self-locking nuts 43 screwed onto extensions 40 adjacent washers 41, the nuts 43 being of the usual hexagonal outline and adapted to be adjusted against washers 41 by the insertion thereon of a hexagonal wrench.

With this construction the planetary bevel gears 34 are rendered self-centering and self-aligning, the turning of self-locking nuts 43 in a clockwise direction adjustably drawing planetary bevel gears 34 into proper meshed engagement with the teeth of input bevel gears 24 thereby preventing undue end play. Inward adjustment of the nuts 43 is transmitted through washers 41 to the inner races 42 of ball bearing assemblies 35, urging the planetary bevel gears into proper meshed engagement with the teeth of the input bevel gears as will be obvious. This construction also provides for the self-centering and self-alignment of the input bevel gears 24 with respect to the planetary bevel gears 34, the inward adjustment of set-screws 33 being transmitted through thrust washers 28 to the inner races 29 of ball bearing assemblies 19, urging the planetary and input bevel gears into proper meshed engagement with each other as will be obvious. Thus, the toothed engagement is at all times tangential, avoiding both endplay and backlash.

The Belleville springs 38 and 22 acting on the inner races 39 and 23, respectively, of the inner ball bearing assemblies 36 and 20 supporting the four bevel gears, preload these bearings and thereby more rigidly support these gears in the interest of minimum backlash.

Rotation of one input bevel gear 24, through the medium of the planetary bevel gears 34 effects a corresponding rotation of the other input bevel gear 24 in the reverse direction. Braking of one input gear accompanied by a simultaneous rotation of the other input bevel gear 24 causes the strut 14 and planetary bevel gears 34 to be rotated about output shaft 11 as an axis, transmitting angular motion to the latter to obtain the differential action.

The above fine adjustment of all four bevel gears is particularly desirable not only for general differential action but also in high precision equipment where small errors of control due to backlash and endplay are so easily multiplied as to become critical.

It should now be apparent that there has been provided a bevel gear differential assembly featuring extremely fine adjustment of all four bevel gears to achieve the best possible mesh, i. e. least possible backlash, breakaway and running torque, by having position control during lapping to thereby improve the involute finish as cut by the gear generator, this adjustment being achieved on the planetary bevel gears by means of threaded ends on the supporting shaft therefor and self-locking nuts and spacer washers, the latter bearing on the inner races of the supporting ball bearing assemblies, and being achieved on the input bevel gears by means of collars pinned to the output shaft and carrying axially spaced set-screws bearing on thrust washers which in turn move these input bevel gears into mesh by bearing on the inner races of the outer supporting ball bearing assemblies. It should also be apparent that there has been provided a bevel gear differential assembly of the above type in which Belleville springs act on the inner races of the inner ball bearing assemblies supporting all four bevel gears to thereby preload these bearings to more rigidly support these gears in the interest of minimum backlash, and wherein the input spur gears are piloted directly on the outer races of the outer supporting ball bearing assemblies thereby eliminating one tolerance for runout accuracy, drive pins being utilized to secure these spur gears to their associated bevel gears.

While various changes may be made in the detailed construction, it shall be understood that such changes shall be within the spirit and scope of the invention as defined by the appended claims.

I claim:

1. In combination in a bevel gear differential assembly, a rotatable shaft and a first pair of spaced bevel gears rotatably mounted thereon, a second shaft fixedly carried by said rotatable shaft intermediate said first pair of bevel gears, the longitudinal axis of said second shaft intersecting the longitudinal axis of said rotatable shaft at substantially right angles, a second pair of bevel gears rotatably mounted on said second shaft on opposite sides of said rotatable shaft, each of said second pair of bevel gears being adapted to mesh with both of said first pair of gears, adjustable means carried by said rotatable shaft adjacent the outer sides of said first pair of gears for adjusting the meshing relationship of said first pair of gears with said second pair of gears, second adjustable means carried by the ends of said second shaft adjacent the outer sides of said second pair of gears for adjusting the end play in the meshing relationship of said second pair of gears with said first pair of gears and spring means carried by said first and second shafts adjacent their point of intersection for urging said first and second gears out of mesh engagement with each other.

2. In combination in a bevel gear differential assembly, a rotatable shaft, a first pair of spaced bevel gears, inner and outer ball bearing assemblies rotatably supporting each of said first pair of bevel gears on said rotatable shaft, each of said inner and outer ball bearing assemblies including concentric inner and outer races, a second shaft fixedly carried by said rotatable shaft intermediate said first pair of gears, the longitudinal axis of said second shaft intersecting the longitudinal axis of said first shaft at substantially right angles, a second pair of bevel gears, second inner and outer ball bearing assemblies rotatably supporting each of said second bevel gears on said second shaft on opposite sides of said first shaft, each of said second inner and outer ball bearing assemblies including concentric inner and outer races, each of said second bevel gears being adapted to mesh with both of said first pair of bevel gears, adjustable means carried by said first shaft bearing on the inner races of said first outer ball bearing assemblies for adjusting the meshing relationship of said first pair of bevel gears with said second pair of gears, second adjustable means carried by said second shaft bearing on the inner races of said second outer ball bearing assemblies for adjusting the end play in the meshing relationship of said second pair of gears with said first pair of gears and spring means carried by said first and second shafts adjacent their point of intersection bearing on the inner races of said first and second inner ball bearing assemblies whereby to preload said bearing assemblies and minimize backlash.

3. In combination in a bevel gear differential assembly, a rotatable shaft, a first pair of spaced bevel gears, ball bearing assemblies rotatably supporting each of said first pair of bevel gears on said rotatable shaft, each of said ball bearing assemblies including concentric inner and outer races, a second shaft fixedly carried by said rotatable shaft intermediate said first pair of gears, the longitudinal axis of said second shaft intersecting the longitudinal axis of said first shaft at substantially right angles, a second pair of bevel gears, second ball bearing assemblies rotatably supporting each of said second bevel gears on said second shaft on opposite sides of said rotatable shaft, each of said second ball bearing assemblies including concentric inner and outer races, each of said second bevel gears being adapted to mesh with both of said first bevel gears, adjustable means carried by said first shaft bearing on the inner races of said first ball bearing assemblies for adjusting the meshing relationship of said first pair of gears with said second pair of gears, second adjustable means carried by said second shaft bearing on the inner races of said second ball bearing assemblies for adjusting the end play in the meshing relationship of said second pair of gears with said first pair of gears and spring means carried by said first and second shafts adjacent their point of intersection bearing on the inner races of said ball bearing assemblies whereby to preload said ball bearing assemblies and minimize backlash.

4. A bevel gear differential assembly according to claim 2, said first adjustable means comprising bevelled washers on said rotatable shaft adjacent each of said first pair of bevel gears and adapted to bear on the inner races of said first outer ball bearing assemblies, collars secured to said rotatable shaft adjacent said bevelled washers and a plurality of radially spaced setscrews mounted within said collars and adapted to be adjusted longitudinally to bear on said bevelled washers.

5. A bevel gear differential assembly according to claim 4, said second adjustable means comprising threaded extensions carried by opposite ends of said second shaft, spacer washers on said extensions adjacent each of said second bevel gears and adapted to bear on the inner races of said second outer ball bearing assemblies, and self-locking nuts screwed onto said extensions and adjustable against said spacer washers.

6. A bevel gear differential assembly according to claim 5, said spring means comprising Belleville washers.

7. A bevel gear differential assembly according to claim 2, including hollow spur gears secured to the outer end of each of said first bevel gears and concentric therewith, said spur gears having substantially the same internal diameter as said first bevel gears and being piloted directly on the outer races of said first outer ball bearing assemblies.

8. A bevel gear differential assembly according to claim 2, each of said first and second pairs of bevel gears having substantially circular grooves on the hollow interiors thereof intermediate said inner and outer ball bearing assemblies and retaining rings within said grooves abutting the sides of the outer races of said first and second inner and outer ball bearing assemblies.

9. A bevel gear differential assembly according to claim 2, including an enlargement fixedly carried by the mid-section of said second shaft, said enlargement having a transverse opening therethrough adapted to receive said rotatable shaft and means for securing said rotatable shaft to said enlargement within said opening.

10. In combination in a bevel gear differential assembly, a rotatable shaft and a pair of spaced first bevel gears rotatably mounted thereon, a hub member fixedly carried by said rotatable shaft intermediate said first bevel gears, a plurality of second bevel gears carried by said hub member and being rotatable about axes radial to said rotatable shaft, each of said second bevel gears meshing with said first bevel gears, first adjustable means carried by said rotatable shaft adjacent the outer sides of said first bevel gears for adjusting the meshing relationship of said first bevel gears with said second bevel gears, second adjustable means carried by said hub member adjacent the outer sides of said second bevel gears for adjusting the end play in the meshing relationship of said second bevel gears with said first bevel gears, and spring means carried by said rotatable shaft and said hub member adjacent the inner sides of said first and second bevel gears for urging said gears out of mesh engagement with each other.

References Cited in the file of this patent

UNITED STATES PATENTS

| Number | Name | Date |
| --- | --- | --- |
| 1,780,745 | Eckart | Nov. 4, 1930 |
| 2,548,258 | Griffith | Apr. 10, 1951 |
| 2,578,155 | Slider | Dec. 11, 1951 |